(12) United States Patent
Akabane

(10) Patent No.: US 9,024,625 B2
(45) Date of Patent: May 5, 2015

(54) ROTATION ANGLE DETECTOR

(71) Applicant: Keihin Corporation, Shinjuku-Ku, Tokyo (JP)

(72) Inventor: Akira Akabane, Kakuda (JP)

(73) Assignee: Keihin Corporation, Tokyo (JP)

( * ) Notice: Subject to any disclaimer, the term of this patent is extended or adjusted under 35 U.S.C. 154(b) by 182 days.

(21) Appl. No.: 13/740,502

(22) Filed: Jan. 14, 2013

(65) Prior Publication Data

US 2013/0241538 A1 Sep. 19, 2013

(30) Foreign Application Priority Data

Mar. 14, 2012 (JP) ................................. 2012-057143

(51) Int. Cl.
*G01B 7/30* (2006.01)
*G01D 5/14* (2006.01)

(52) U.S. Cl.
CPC . *G01B 7/30* (2013.01); *G01D 5/145* (2013.01)

(58) Field of Classification Search
CPC .................. G01R 33/0011; G01B 7/30; F02D 2200/0404; F02D 9/0105
USPC .................................................... 324/207.25
See application file for complete search history.

(56) References Cited

U.S. PATENT DOCUMENTS

| 4,065,235 | A * | 12/1977 | Furlong et al. ................ 417/420 |
| 5,676,600 | A * | 10/1997 | Campbell ..................... 464/170 |
| 6,469,502 | B2 * | 10/2002 | Fischer et al. ............ 324/207.2 |
| 7,148,680 | B2 * | 12/2006 | Mizutani et al. ......... 324/207.25 |
| 2003/0164652 | A1 * | 9/2003 | Tamura et al. .............. 310/68 B |
| 2006/0208727 | A1 * | 9/2006 | Matsumoto et al. ..... 324/207.25 |
| 2008/0150238 | A1 * | 6/2008 | Yarimizu et al. ............... 277/317 |
| 2009/0151436 | A1 * | 6/2009 | Nagahori et al. .......... 73/114.36 |
| 2009/0160373 | A1 * | 6/2009 | Katou et al. .................. 318/286 |
| 2010/0090633 | A1 * | 4/2010 | Deller et al. ............. 318/400.39 |
| 2010/0148764 | A1 * | 6/2010 | Abe et al. ................. 324/207.25 |
| 2010/0219711 | A1 * | 9/2010 | Gruendl et al. .......... 310/156.25 |
| 2011/0304146 | A1 * | 12/2011 | Surodin .......................... 290/54 |
| 2012/0153940 | A1 * | 6/2012 | Schrubbe ................. 324/207.25 |
| 2012/0160364 | A1 * | 6/2012 | Katou et al. ................. 140/93.6 |
| 2012/0176073 | A1 * | 7/2012 | Amagasa ................. 318/400.38 |
| 2012/0204638 | A1 * | 8/2012 | Kakuda et al. .................. 73/494 |
| 2012/0256619 | A1 * | 10/2012 | Muto et al. ............... 324/207.12 |
| 2013/0162057 | A1 * | 6/2013 | Turner .......................... 310/10 |

FOREIGN PATENT DOCUMENTS

JP 2009-019926 A 1/2009

* cited by examiner

*Primary Examiner* — Benjamin M Baldridge
(74) *Attorney, Agent, or Firm* — Carrier Blackman & Associates, P.C.; Joseph P. Carrier; William D. Blackman

(57) ABSTRACT

A rotation angle detector includes: a magnet attached to a rotating shaft and magnetized in a certain direction orthogonal to an axis of the rotating shaft; and a non-rotary magneto-electric transducer placed to be opposed to an end surface of the magnet, and configured to detect a rotation angle of the rotating shaft in cooperation with the magnet through magneto-electric transduction. A concave curved surface is formed in the end surface of the magnet in order to make a magnetic flux of a magnetic field facing the end surface of the magnet closer to the magnet and flattened. Accordingly, it is possible to provide a rotation angle detector which is compact in size and has a stable accuracy for detecting the rotation angle, by making the curvature of the magnetic flux near the end surface of the magnet small and placing the magneto-electric transducer in that location.

4 Claims, 2 Drawing Sheets

ROTATION ANGLE DETECTOR

CROSS-REFERENCE TO RELATED APPLICATION

The present application claims priority under 35 USC 119 to Japanese Patent Application No. 2012-57143 filed on Mar. 14, 2012 the entire contents of which are hereby incorporated by reference.

BACKGROUND OF THE INVENTION

1. Field of the Invention

The present invention relates to an improvement of a rotation angle detector comprising: a magnet attached to a rotating shaft, and magnetized in a certain direction orthogonal to an axis of the rotating shaft; and a non-rotary magneto-electric transducer placed so as to be opposed to an end surface of the magnet, and configured to detect a rotation angle of the rotating shaft in cooperation with the magnet through magneto-electric transduction.

2. Description of the Related Art

Such a rotation angle detector is already known, as disclosed in, for example, Japanese Patent Application Laid-open No. 2009-19926.

As shown in FIG. 3, in a solid cylindrical magnet 010 of such a conventional rotation angle detector, an end surface 010a facing magneto-electric transducers 015 is formed as a flat surface orthogonal to an axis Y of a rotating shaft 2. In a magnetic field M which the end surface 010a of the magnet 010 of this kind faces, the curvature of an arc-shaped magnetic flux f becomes smaller as the magnetic flux f gets farther from the end surface 010a of the magnet 010. For this reason, if the magneto-electric transducers 015 are placed sufficiently closer to the end surface 010a of the magnet 010 in order to make the rotation angle detector compact in size, even the slightest variation in a positional relationship between the magnet 010 and the magneto-electric transducers 015 due to a factor such as a change in ambient temperature or a lapse of time changes magnetism sensed by the magneto-electric transducers 015, and accordingly influences accuracy at which the rotation angle is detected. With this taken into consideration, a conventional practice adopted to stabilize the accuracy with which the rotation angle is detected is to place magnetism sensing centers C02 of the respective magneto-electric transducers 015 in a location which is relatively away from the end surface 010a of the magnet 010, and where the curvature of the arc-shaped magnetic flux f is relatively small. In this case, however, it is difficult to make the rotation angle detector compact in size.

SUMMARY OF THE INVENTION

The present invention has been made with the foregoing situation taken into consideration. An object of the present invention is to provide a rotation angle detector which is compact in size and has a stable accuracy for detecting the rotation angle, by making the curvature of magnetic flux near an end surface of a magnet small and placing a magneto-electric transducer in that location.

In order to achieve the object, according to a first feature of the present invention, there is provided a rotation angle detector comprising: a magnet attached to a rotating shaft, and magnetized in a certain or predetermined direction orthogonal to an axis of the rotating shaft; and a non-rotary magneto-electric transducer placed so as to be opposed to an end surface of the magnet, and configured to detect a rotation angle of the rotating shaft in cooperation with the magnet through magneto-electric transduction, wherein a concave curved surface is formed in the end surface of the magnet in order to make a magnetic flux of a magnetic field facing the end surface of the magnet closer to the magnet and flattened.

According to the first feature of the present invention, the magnetic flux of the magnetic field facing the end surface of the magnet shifts toward the magnet by the effect of the formation of the concave curved surface in the end surface of the magnet. As a result, the curvature of the magnetic flux near the end surface of the magnet becomes smaller. For this reason, when the magneto-electric transducer is placed in a location close to the magnet to make the rotation angle detector compact in size, the magneto-electric transducer senses the magnetism in the place where the curvature of the magnetic flux is small. Accordingly, even if the positional relationship between the magnet and the magneto-electric transducer varies to some extent, a change in the magnetism sensed by the magneto-electric transducer is very small. This makes it possible to stabilize the accuracy with which the rotation angle of the rotating shaft is detected. Thereby, it is possible to satisfy both the object of making the rotation angle detector compact in size and the object of stabilizing the accuracy of the detection of the rotation angle.

According to a second feature of the present invention, in addition to the first feature, the magnet is made from a magnetic synthetic resin, and the magnet is molded on an end portion of the rotating shaft.

With the second feature of the present invention, no specialized attachment means such as a screw, an adhesive, or crimping is necessary for attaching the magnet to the rotating shaft. This makes it possible to simplify the production, and to reduce costs. Moreover, since the magnetization of the magnetic synthetic resin is carried out after the magnetic synthetic resin is molded on the rotating shaft, a predetermined reference angular position of the rotating shaft and a direction of the magnetization of the magnet can be set exactly. Accordingly, it is possible to obtain the rotation angle detector with high accuracy.

According to a third feature of the present invention, in addition to the first feature, the concave curved surface is formed as a concave spherical surface having a center on the axis of the rotating shaft, and a magnetism sensing center of the magneto-electric transducer is placed at or in a vicinity of the center.

With the third feature of the present invention, even if the magnet somewhat tilts to the magneto-electric transducer, or vice versa, due to a factor such as a change in ambient temperature or a lapse of time, little change occurs in the condition of the magnetic field in which the magneto-electric transducer is placed. Accordingly, it is possible to stabilize the accuracy with which the rotation angle of the rotating shaft is detected.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be provided hereinbelow of an embodiment of the present invention on the basis of the accompanying drawings.

Figure 1:
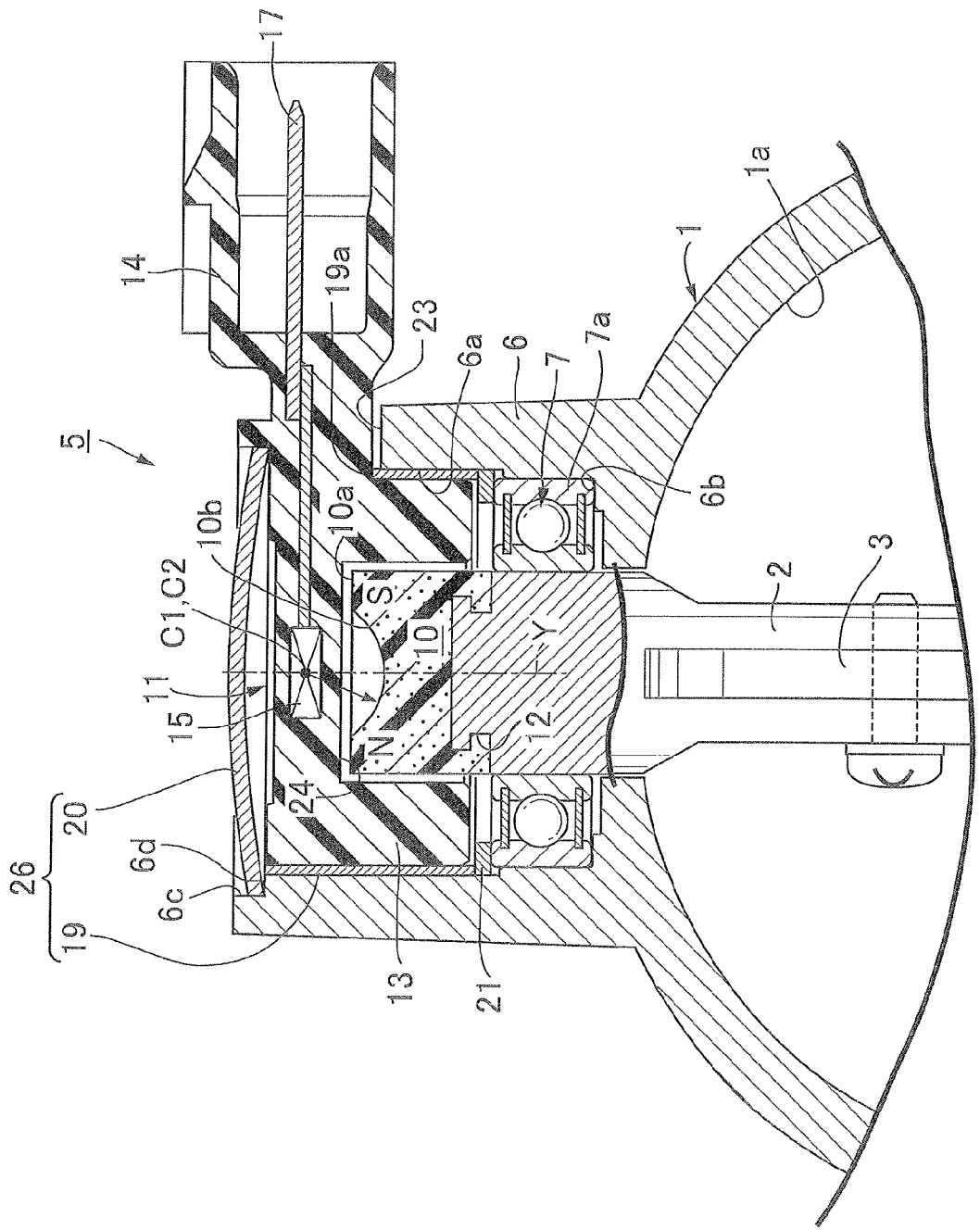
FIG. 1 is a longitudinal sectional view of a rotation angle detector according to an embodiment of the present invention.

First of all, in FIG. 1, reference numeral 1 denotes a throttle body constituting a part of an intake system of an engine. The throttle body 1 includes, in its inside, an intake passage 1a communicating with an intake port of the engine. A rotating shaft 2 placed traversing the intake passage 1a is rotatably supported by the throttle body 1. A butterfly-type throttle valve 3 configured to open and close the intake passage 1a is screwed to the rotating shaft 2. A throttle lever for manual operation or an electric motor for automatic operation therefor (neither of which is shown) is connected to an end portion of the rotating shaft 2. A rotation angle detector 5 configured to detect the opening degree of the throttle valve 3 is connected to the opposite end portion of the rotating shaft 2.

A pair of cylindrical bearing bosses 6 (only one of which is shown) are formed on an outside surface of the throttle body 1 and protrude outward in a radial direction of the intake passage 1a. An outer race 7a of a sealed ball bearing 7 configured to rotatably support the rotating shaft 2 is press-fitted in a hollow portion, namely an attachment hole 6a, of one of the bearing bosses 6. The press-fitted depth is restricted by the contact of the outer race 7a with a bottom portion 6b of the attachment hole 6a.

The rotation angle detector 5 includes: a magnet 10 connected to a tip end portion of the rotating shaft 2 in a way that is situated in a center portion of the attachment hole 6a; and a magneto-electric transducing unit 11 attached to the bearing boss 6.

The magnet 10 has a similar diameter as the end portion of the rotating shaft 2, has a solid cylindrical shape, and is made from a magnetic synthetic resin. The magnet 10 is molded on the end portion of the rotating shaft 2. During the molding, a concave curved surface 10b is formed on an end surface 10a of the magnet 10 which is opposed to magneto-electric transducers 15 of the magneto-electric transducing unit 11. In FIG. 1, the concave spherical surface 10b thus formed as the concave curved surface 10b has its center C1 on an axis Y of the rotating shaft 2. An anchor groove 12 is formed in an outer peripheral surface of the rotating shaft 2 to allow the material of the magnet 10 to enter the anchor groove 12 and thus increase the bonding strength between the rotating shaft 2 and the magnet 10.

The magnet 10 is magnetized in a certain direction orthogonal to the axis Y of the rotating shaft 2. Thereby, the magnet 10 has the north and south poles at opposed positions on its predetermined diameter line.

The magneto-electric transducing unit 11 includes: a cylindrical package 13 made from an insulating synthetic resin; a coupler 14 formed integrally with the package 13 in a way that projects from an outer peripheral surface of the package 13; the magneto-electric transducers 15 embedded in a center portion of the package 13; and multiple signal terminals 17 through which signals from the magneto-electric transducers 15 are outputted to the outside, and which are held by the coupler 14. Hall elements, for example, are used for the magneto-electric transducers 15. The magneto-electric transducers 15 are placed with their magnetism sensing centers C2 situated at or in the vicinity of the center C1 of the concave spherical surface 10b of the magnet 10.

A cylindrical magnetic tube body 19 made of a steel plate is attached to an outer periphery of the cylindrical package 13 by outsert molding. The magnetic tube body 19 is provided with a cutout 19a for receiving a base of the coupler 14. The magnetic tube body 19 is, together with the package 13, fitted in the attachment hole 6a of the bearing boss 6 with light pressure, and an inner end of the magnetic tube body 19 is placed to be in contact with an outer end surface of the outer race 7a of the ball bearing 7 with a shim 21 interposed in between.

The bearing boss 6 is provided with, in its peripheral wall, a positioning groove 23 for receiving the base of the coupler 14 projecting from the outer peripheral surface of the package 13 and for restricting a position at which the base of the coupler 14 is fitted in the attachment hole 6a of the magneto-electric transducing unit 11. In addition, a recessed portion 24 for housing the magnet 10 in a non-contact manner is provided in an inner end surface of the package 13.

A lock hole 6c continuing to an opening end of the attachment hole 6a through a step portion 6d facing outwards is provided to an outer end surface of the bearing boss 6. The lock hole 6c is formed sufficiently shallow and with a diameter larger than that of the attachment hole 6a, while the step portion 6d is formed substantially flush with outer end surfaces of the package 13 and the magnetic tube body 19. After the magneto-electric transducing unit 11 is fitted into the attachment hole 6a, a magnetic lid plate 20 made of a steel plate is press-fitted into the lock hole 6c until the magnetic lid plate 20 starts to press the outer end surface of the magnetic tube body 19.

The magnetic lid plate 20 is formed in a way that its center swells outward, with respect to the intake passage 1a, from its outer periphery, and has elastic force in a direction in which the radius of the magnetic lid plate 20 expands. The magnetic lid plate 20 is firmly fixed to the bearing boss 6 with its outer peripheral edge biting into the inner peripheral surface of the lock hole 6c due to the elastic force. Thereby, the magnetic lid plate 20 holds the magneto-electric transducing unit 11 in the attachment hole 6a, and keeps the magnetic tube body 19 in contact with the outer race 7a of the ball bearing 7 with the shim 21 interposed between the magnetic tube body 19 and the outer race 7a. A plate thickness of the shim 21 is so selected that a predetermined space in an axial direction can be given between the magnet 10 and the package 13, in other words, that a distance between the magnet 10 and the magneto-electric transducers 15 can be set in compliance with predetermined values. The magnetic tube body 19 and the magnetic lid plate 20 form a magnetic shield 26 covering the outer peripheral surface and the outer end surface of the package 13. Here, the shim 21 is unnecessary if the package 13 is so attached that the distance between the magnet 10 and the magneto-electric transducers 15 can be set in compliance with the predetermined values.

Next, descriptions will be provided for operations of this embodiment.

The magneto-electric transducers 15 are placed in a magnetic field M which the end surface 10a of the magnet 10 faces, and produce voltages in accordance with the magnetism sensed by the magneto-electric transducers 15. Once the magnet 10 connected to the rotating shaft 2 changes its rotating position in accordance with a change in the opening degree of the throttle valve 3, the amounts of magnetism sensed by the magneto-electric transducers 15 change in accordance with an change in a direction of the magnetic field M of the magnet 10 with respect to the magneto-electric transducers 15. For this reason, the voltages produced by the magneto-electric transducers 15 change. The voltage signals are outputted to an electronic control unit connected to the signal terminals 17. The electronic control unit performs calculation on the signals, and thus finds the opening degree of the throttle valve 3. Its data is used to control the amount of fuel to be injected in the engine, ignition timings, and the like.

Figure 2:
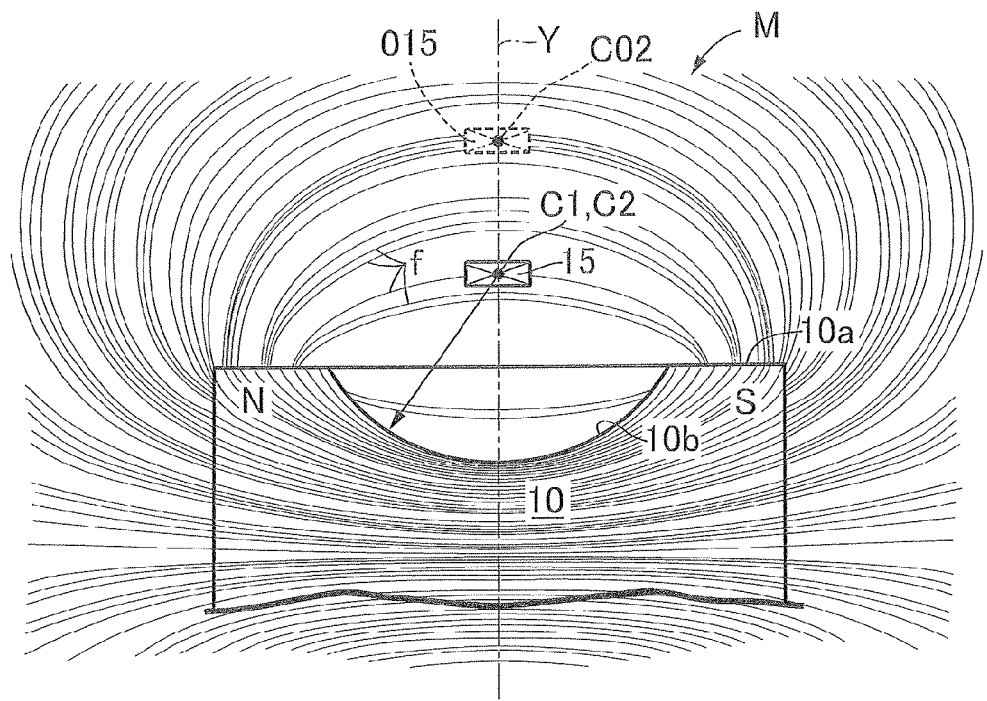
FIG. 2 is a longitudinal sectional view showing a relationship between a magnetic field in the vicinity of an end surface of a magnet and a location of a magneto-electric transducer in the rotation angle detector.
Figure 3:
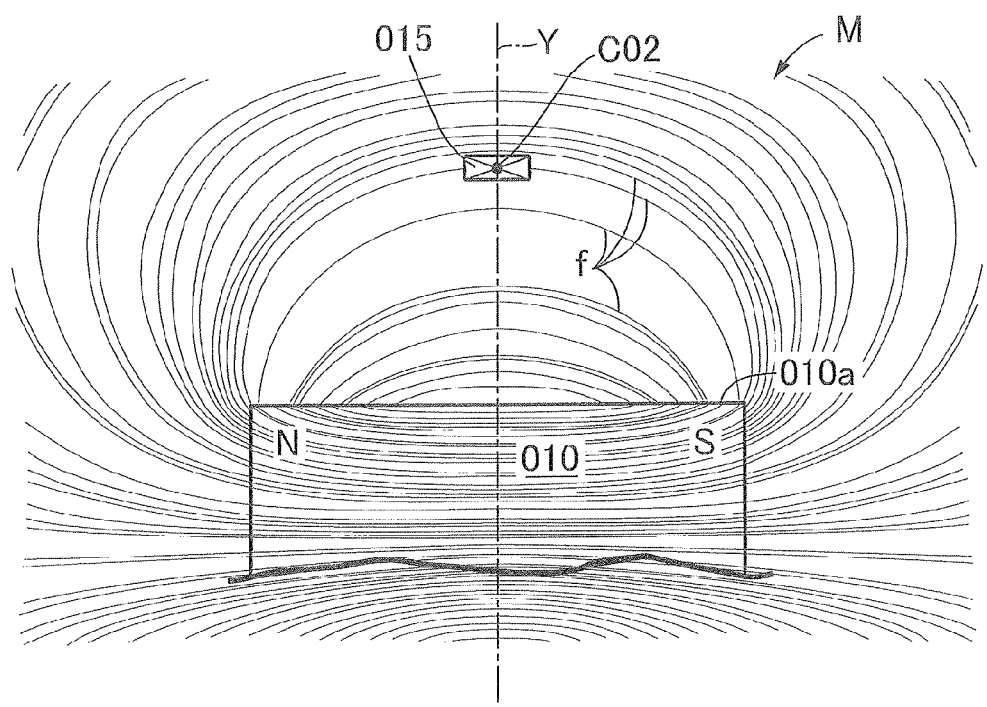
FIG. 3 is a longitudinal sectional view showing a relationship between a magnet field in the vicinity of an end surface of a magnet and a location of a magneto-electric transducer in a conventional rotation angle detector.

Meanwhile, the synthetic-resin-made magnet 10 molded on the end portion of the rotating shaft 2 has the concave curved surface 10b in the end surface 10a facing the magneto-electric transducers 15. Accordingly, the magnetic field M of the magnet 10 shifts toward the magnet 10 by the effect of the concave curve of the concave curved surface 10b, as shown in FIG. 2. As a result, the curvature of an arc-shaped magnetic flux f facing the end surface 10a of the magnet 10 becomes smaller, and particularly a center portion of the magnetic flux f becomes flat. For this reason, when the magneto-electric transducers 15 are placed in a location sufficiently closer to the magnet 10 than the conventional magneto-electric transducers 015 to make the rotation angle detector 5 compact in size, the magneto-electric transducers 15 sense the magnetism in the place where the magnetic flux f becomes flat. Accordingly, even if the positional relationship between the magnet 10 and the magneto-electric transducers 15 varies to some extent, a change of the magnetic flux f in the magnetism sensed by the magneto-electric transducers 15 is very small. This makes it possible to stabilize the accuracy with which the rotation angle of the rotating shaft 2 is detected. Thereby, it is possible to satisfy both the object of making the rotation angle detector 5 compact in size and the object of stabilizing the accuracy of the detection of the rotation angle.

In addition, the concave spherical surface 10b having its center C1 on the axis Y of the rotating shaft 2 is formed in the end surface 10a of the magnet 10, and the magnetism sensing centers C2 of the magneto-electric transducers 15 are placed at or in the vicinity of the center C1. For these reasons, even if the magnet 10 somewhat tilts to the magneto-electric transducers 15, or vice versa, due to a change in ambient temperature or with time, little change occurs in the condition of the magnetic field M in which the magneto-electric transducers 15 are placed. Accordingly, it is possible to stabilize the accuracy with which the rotation angle of the rotating shaft 2 is detected.

Moreover, the magnet 10 is made from a magnetic synthetic resin, and is molded on the end portion of the rotating shaft 2. For this reason, no specialized attachment means such as a screw, an adhesive, or crimping is necessary for attaching the magnet 10 to the rotating shaft 2. This makes it possible to simplify the production, and to reduce costs. Moreover, since the magnetization of the magnetic synthetic resin is carried out after the magnetic synthetic resin is molded on the rotating shaft 2, a predetermined reference angular position of the rotating shaft 2 and a direction of the magnetization of the magnet 10 can be set exactly. Accordingly, it is possible to obtain the rotation angle detector 5 with high accuracy.

The present invention is not limited to the foregoing embodiment, and various design changes can be made within a scope not departing from the gist of the present invention. For example, the rotation angle detector of the present invention is not limited to the detection of the opening degree of the throttle valve 3, and can be applied to a rotation angle detector for various apparatuses. In addition, the magneto-electric transducers 15 can be made from an integrated magneto-electric transducer which internally has multiple magneto-electric transducers whose detection axes intersect one another.

What is claimed is:

1. A rotation angle detector comprising:
a magnet attached to an end portion of a rotating shaft, and magnetized in a predetermined direction orthogonal to an axis of the rotating shaft; and
a non-rotary magneto-electric transducer placed so as to be opposed to an end surface of the magnet in a direction of the axis of the rotating shaft, that detects a rotation angle of the rotating shaft in cooperation with the magnet through magneto-electric transduction, wherein
the magnet has a similar diameter as the end portion of the rotating shaft and has a solid cylindrical shape, and
a concave curved surface is formed in the end surface of the magnet opposite the non-rotary magneto-electric transducer in order to direct a magnetic flux of a magnetic field of the magnet closer to the magnet in the direction of the axis of the rotating shaft.

2. The rotation angle detector according to claim 1, wherein
the rotating shaft is formed with an anchor groove at its end portion and the magnet is provided to enter the anchor groove to increase a bonding strength between the rotating shaft and the magnet.

3. The rotation angle detector according to claim 1, wherein
the concave curved surface is formed as a concave spherical surface having a center on the axis of the rotating shaft, and
a magnetism sensing center of the magneto-electric transducer is placed at or in a vicinity of the center.

4. The rotation angle detector according to claim 2, wherein
the magnet is made from a magnetic synthetic resin, and the magnet is molded on an end portion of the rotating shaft.

* * * * *